United States Patent
Garvey

(10) Patent No.: US 6,612,417 B2
(45) Date of Patent: Sep. 2, 2003

(54) PRODUCT CONVEYING AND ACCUMULATION SYSTEM AND METHOD

(75) Inventor: Mark C. Garvey, Cedarbrook, NJ (US)

(73) Assignee: Garvey Corporation, Blue Anchor, NJ (US)

( * ) Notice: Subject to any disclaimer, the term of this patent is extended or adjusted under 35 U.S.C. 154(b) by 21 days.

(21) Appl. No.: 10/016,822

(22) Filed: Dec. 7, 2001

(65) Prior Publication Data
US 2003/0106772 A1 Jun. 12, 2003

(51) Int. Cl.[7] ............................................. B65G 47/12
(52) U.S. Cl. ....................... 198/443; 198/580; 198/831; 198/607
(58) Field of Search .............................. 198/580, 778, 198/443, 831, 607

(56) References Cited

U.S. PATENT DOCUMENTS

| | | | | |
|---|---|---|---|---|
| 2,784,566 A | * | 3/1957 | Reynolds | 62/71 |
| 2,873,019 A | * | 2/1959 | Kay et al. | 198/463.4 |
| 2,911,345 A | * | 11/1959 | Swenson | 204/201 |
| 2,941,651 A | * | 6/1960 | Hutter et al. | 198/443 |
| 3,049,215 A | * | 8/1962 | Hutter et al. | 198/443 |
| 4,401,207 A | * | 8/1983 | Garvey | 198/580 |
| 4,962,842 A | * | 10/1990 | Limoni | 198/443 |
| 5,040,941 A | | 8/1991 | Wilding et al. | |
| 5,044,487 A | * | 9/1991 | Spatafora et al. | 198/392 |
| 5,282,525 A | | 2/1994 | Covert | |
| 6,168,005 B1 | | 1/2001 | Petrovic | |

* cited by examiner

Primary Examiner—Kathy Matecki
Assistant Examiner—Richard Ridley
(74) Attorney, Agent, or Firm—Stuart M. Goldstein

(57) ABSTRACT

A product conveying and accumulation system is provided for use with products of various sizes, shapes, and stability characteristics. The system comprises multiple moving conveyors, including a first conveyor which transports product from an upstream location to the inner path of an accumulator conveyor. The accumulator conveyor, traveling at a substantially similar speed or a designated variable speed as the first conveyor or conveyors, is aligned in the same plane as, is adjacent to, and may mate with the first conveyor at a predetermined location at the inner path of the accumulator conveyor for contiguous movement in the same direction as the first conveyor at this predetermined location. As product from upstream is delivered to the inner path of the accumulator conveyor, it eventually travels to the outer path and then accumulates inwardly, such that the earlier delivered product remains substantially at the outer path, where a product guide generally directs product on the outermost paths to the downstream destination. In this manner, the first products which are delivered to the accumulator conveyor are generally the first products transported downstream.

33 Claims, 4 Drawing Sheets

PRODUCT CONVEYING AND ACCUMULATION SYSTEM AND METHOD

BACKGROUND OF THE INVENTION

Product accumulation systems are routinely used in conjunction with conveyors for the storage and accumulation of product which is fed from an upstream source onto conveyors. In the normal operation of this type system, product is placed on a conveyor at the upstream location, for instance at one operational station, and then transported to a downstream location by conveyor where the next step in the manufacture or distribution of the product is to be accomplished.

It is not uncommon that, during this process, there may be a disruption at a downstream location caused by a malfunction of machinery, some constraining problem, or other circumstance which prevents downstream machine from accepting products. Continued operation of production upstream may result in the build-up of line back pressure which could cause a further problem in permitting the unrestricted movement of product. However, if such a disruption is one which can be addressed relatively quickly, upstream product which normally would be transported to the malfunctioning location, can be received and temporarily stored by an accumulator which is integral to the system.

By employing such an accumulator, the upstream machinery can continue to operate by moving product to the accumulator. Since product movement can continue, there is no build-up of line pressure. Such a system also saves the substantial time and expense which would result in having to shutdown and then restart the entire system, if no accumulator was otherwise available.

As product is being received and retained by the accumulator, the downstream problem can be addressed. When that part of the system resumes full operation, the products stored in the accumulator are released to the downstream destination, with little downtime to the system. Products can also be received and stored at the accumulator in case there is an upstream disruption. In this case, accumulated products could be retained and sent downstream in order to keep the system operational while the upstream problem is being remedied.

Co-pending U.S. application Ser. No. 09/984,682, relates to a product conveying and accumulation system with multiple conveyors, including product supply and discharge conveyors and an accumulator conveyor. The accumulator conveyor in this system efficiently and smoothly receives product for accumulation, should there be a disruption in the system, and for effectively delivering product to conveyors for downstream destinations, after the disruption is addressed. However, an important consideration not included in this application, and inadequately addressed by prior conveyor/accumulator systems, concerns the need to ensure that product which has been placed on accumulator systems does not languish on the accumulator component of the system, while later delivered product is being transported downstream. This "first in-first out" concept takes on greater significance when the product being transported is perishable in nature. Such products will spoil and be lost if allowed to remain on accumulators, in favor of product which is newly received from upstream sources.

SUMMARY OF THE INVENTION

It is thus the object of the present invention to overcome the limitations and disadvantages of prior product conveying and accumulation systems.

It is an object of the present invention to provide a product conveying and accumulation system and method which allows products received and accumulated during the production process to be delivered to downstream destinations efficiently and effectively.

It is a further object of the present invention to provide a product conveying and accumulation system and method which generally ensures that first product into the system is the first product out.

It is thus an object of the present invention to provide a product conveying and accumulation system and method in which products transported to the accumulator component are delivered to downstream destinations substantially in the order they enter the system.

It is still another object of the present invention to provide a product conveying and accumulation system and method substantially ensures first in-first out product transfer while allowing upstream supply to the system from a variety of entry points.

These and other objects are accomplished by the present invention which consists of a product conveying and accumulation system for use with products of various sizes, shapes and stability characteristics. The system comprises multiple moving conveyors, including a first conveyor which transports product from an upstream location to the inner path of an accumulator conveyor. The accumulator conveyor, traveling at a substantially similar speed or a designated variable speed as the first conveyor or conveyors, is aligned in the same plane as, is adjacent to, and may mate with the first conveyor at a predetermined location at the inner path of the accumulator conveyor for contiguous movement in the same direction as the first conveyor at this predetermined location. As product from upstream is delivered to the inner path of the accumulator conveyor, it eventually travels to the outer path and then accumulates inwardly, such that the earlier delivered product remains substantially at the outer path, where a product guide generally directs product on the outermost paths to the downstream destination. In this manner, the first products which are delivered to the accumulator conveyor are generally the first products transported downstream.

Novel features which are considered as characteristic of the invention are set forth in particular in the appended claims. The invention, itself, however, both as to its design, construction and use, together with the additional features and advantages thereof, are best understood upon review of the following detailed description with reference to the accompanying drawings.

DETAILED DESCRIPTION OF THE INVENTION

Figure 1:
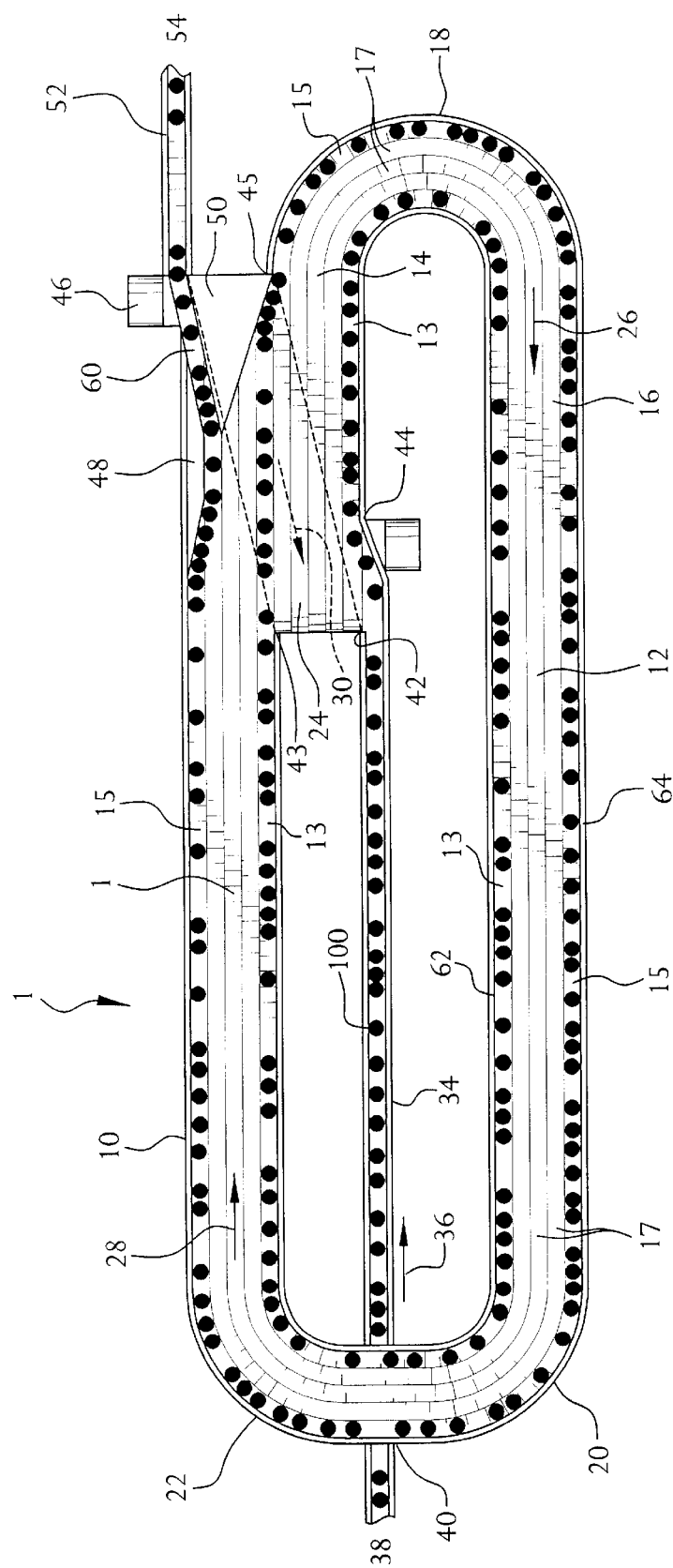
FIG. 1 is a top view of the product conveying and accumulation system of the present invention, showing the directional movement of components in the system and the order of product delivery from an upstream to a downstream destination.

With reference to FIG. 1, the product conveying and accumulation system 1 of the present invention comprises conveyor/accumulator system 10, comprising conveyor 12. Conveyor 12 includes accumulator section 14 and recirculating section 16 which extends from accumulator section 14, through turn sections 18, 20 and 22. All of these sections make up a single, continuous conveyor path, which is completed by section 24 of conveyor 12. Section 24 is positioned underneath and wraps down and then up to accumulator section 14. Conveyor 12 comprises continuous inner pathway surface 13, continuous outer pathway surface 15, and intermediate pathway surfaces 17, located between inner surface 13 and outer surface 15. Conveyor 12, with its pathway surfaces 13, 15 and 17, moves at a predetermined speed. The direction of travel of conveyor 12 is depicted by directional arrows 26, 28, and 30.

Conveyor 34, in the embodiment shown in FIG. 1, moves at a predetermined speed in direction 36. Conveyor 34 extends from an upstream location or station 38, beneath conveyor 12 at location 40. Conveyor 34 then obliquely rises to substantially the same level as accumulator section 14 of conveyor 12. In fact, accumulator section 14 of conveyor 12 is located in the same transverse plane and is aligned to conveyor 34 between locations 42 and 44. In this configuration, conveyors 12 and 34 run adjacent to each other in the same transverse plane, and move contiguously in the same direction between locations 42 and 44. It is contemplated that conveyor 12 and conveyor 34 can also be moveable mated, in a manner which is commonly employed in the industry, as they move contiguously between locations 42 and 44.

Both conveyor 12 and conveyor 34 are powered for movement by well-known drive means from a motor or other suitable power source. Drive means 46 for conveyor 12 is shown. Conveyor 12 can be set to travel at a speed which is substantially similar to the speed of conveyor 34, when the entire system is operational, or at a variable speed, depending on the characteristic nature of the product and the speed at which product is being delivered from upstream and supplied downstream. For instance, when handling inherently unstable product, e.g. empty lightweight plastic containers, it has been found that in order to maintain such product in their upright positions, the conveyors can be operated at identical speeds. However, optimal performance for such product appears to be obtained by varying conveyor speeds only slightly. For products which are heavier and thus more stable, conveyor speeds are more dependent upon the supply of product to the accumulator system and the downstream demand.

Guides 48 and 50 are designed to smoothly direct product being transported on conveyor 12 via independent conveyor 52, to downstream location 54 and also to smoothly direct product for recirculation and accumulation to recirculating section 16, especially when there is a disruption and stoppage of product downstream. Guides 48 and 50 define channel 60, which is configured as a passage adapted to accept, maintain, and move product downstream to conveyor 52.

Inside guide rail 62, extending around and adjacent to inner pathway 13, assists in and maintains product within accumulator section 14 and recirculating section 16. Outer guard rail 64, extending around and adjacent to outer pathway 15, maintains the outer boundaries of recirculation section 16.

In normal operation, that is when there is full production without disruption or constraint, conveyor 12 and conveyor 34 are optimally set to run in tandem, at substantially similar or variable speeds, depending on the need, as discussed above. Product 100, for instance bottles, are delivered from upstream station 38 and is moved by means of conveyor 34 to inner pathway 13 of conveyor 12. As pathway 13 and conveyor 34 are in adjacent alignment, in the same transverse plane between locations 42 and 44, product is smoothly transferred from conveyor 34 to pathway 13. Product 100 then is transported on inner pathway 13 until it reaches location 43, where it continues its movement approximately to location 45, ultimately becoming positioned on outer pathway 15. Product 100 then continues around outer pathway 15 until it encounters guide section 48, where it is directed through channel 60 to conveyor 52 and downstream destination 54. In this manner, during normal operation and when product supply equals product demand, product which enters conveyor/accumulator 10, is immediately transferred downstream.

Figure 2:
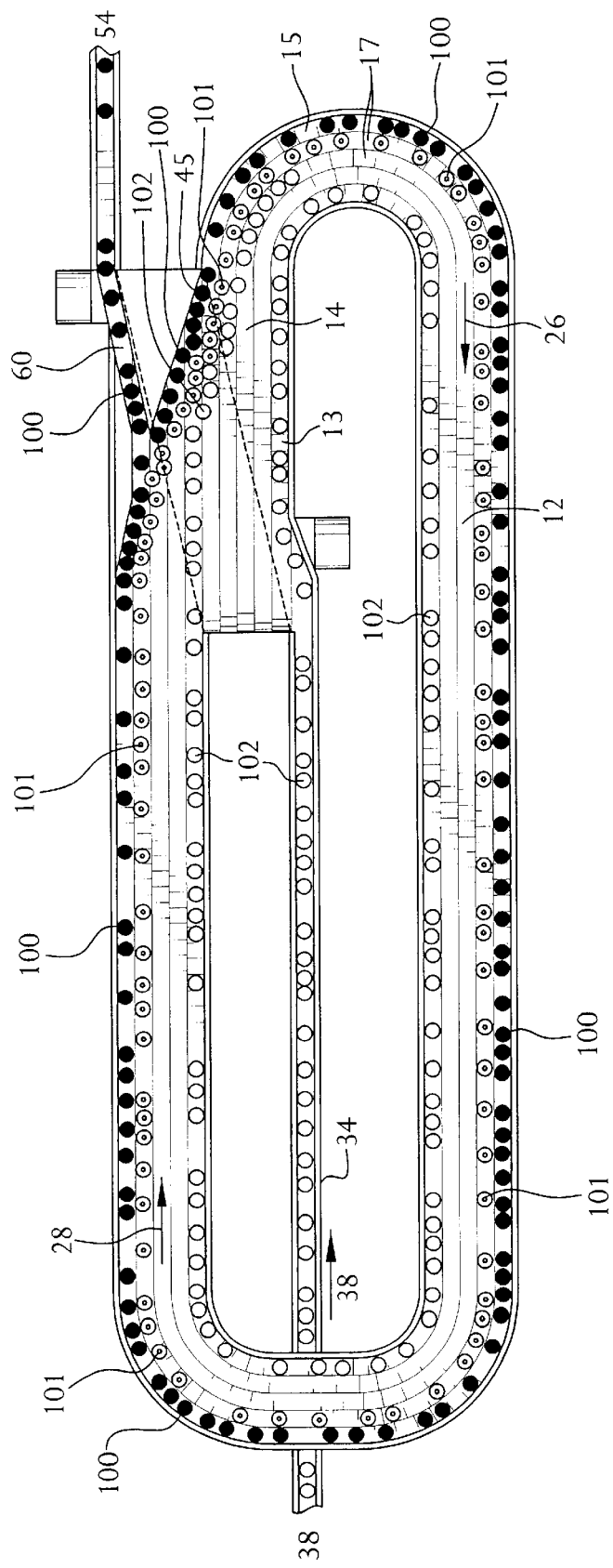
FIG. 2 is a top view of the product conveying and accumulation system of the present invention, showing the order of product delivery from an upstream to a downstream destination when product has accumulated on the system.

However, in circumstances in which there is a stoppage of product flow to downstream destination 54 or product supply from upstream 38 exceeds downstream discharge, product will accumulate on conveyor 12 and its accumulator section 14. In accordance with the herein invention, product supplied to conveyor 12 and accumulator section 14 generally will be discharged downstream in the order it is received from upstream conveyor 34, as follows. Referring to FIG. 2, product 100 initially enters system 10 at 42, onto inner pathway surface 13. If there is a stoppage of product to the system or a slowdown of delivery of product to downstream destination 54, the first cycle of delivered product 100 (each such product is shown as a filled in circle in FIG. 2) will accumulate substantially on outer pathway surface 15.

The next cycle of product 101 which enters system 10 (each such product is shown as a circle within a circle in FIG. 2) first travels onto and around inner pathway surface 13, until it reaches the area designated as location 45. At this approximate location, product 101 will be arranged and substantially accumulate inboard of and adjacent to product 100, still located on outer pathway surface 15. Product 101 then travels on and along intermediate pathway surface 17, with product 100 remaining substantially on outer pathway surface 15. In this manner, earlier delivered product 100 will always be recirculated on outer pathway surface 15 and thus be delivered to channel 60 and downstream destination 54 before product 101 which later enters the system.

When the next cycle of product 102 enters system 10 (each such product is shown as an open circle in FIG. 2), these products again initially travel onto and around inner pathway surface 13, until they reach location 45. There they will then arrange themselves and substantially accumulate on intermediate pathway surfaces 17 adjacent to, but inboard of earlier delivered product 101, which are substantially located on the outermost regions of the intermediate pathway surfaces. Products 101 and 102 then travel on and along these intermediate pathway surfaces, and product 100 substantially remains on outer pathway surface 15.

It thus can be appreciated that, as more product enters conveyor/accumulator system 10, it generally will continue to accumulate from outer pathway 15, inboard on intermediate pathways 17, toward inner pathway 13. The earliest delivered product therefore generally will be located at or near outer pathway 15 and the adjacent outermost regions of intermediate pathways 17. The later delivered product will be accumulated and recirculated on inner pathway 13 and the adjacent innermost regions of intermediate pathways 17.

When flow to downstream destination is resumed, earlier delivered product located on outer pathway 15 and the adjacent outer regions of intermediate pathways 17 generally will be discharged to downstream destination 54 through channel 60 before the later delivered product, located on inner pathway 13 and adjacent inner regions of intermediate pathways 17.

Movement of individualized product units cannot be controlled precisely. However, the configuration of the present invention will ensure that the first products entering conveyor/accumulator system 10 generally will be the first products to exit the system.

Figure 3:
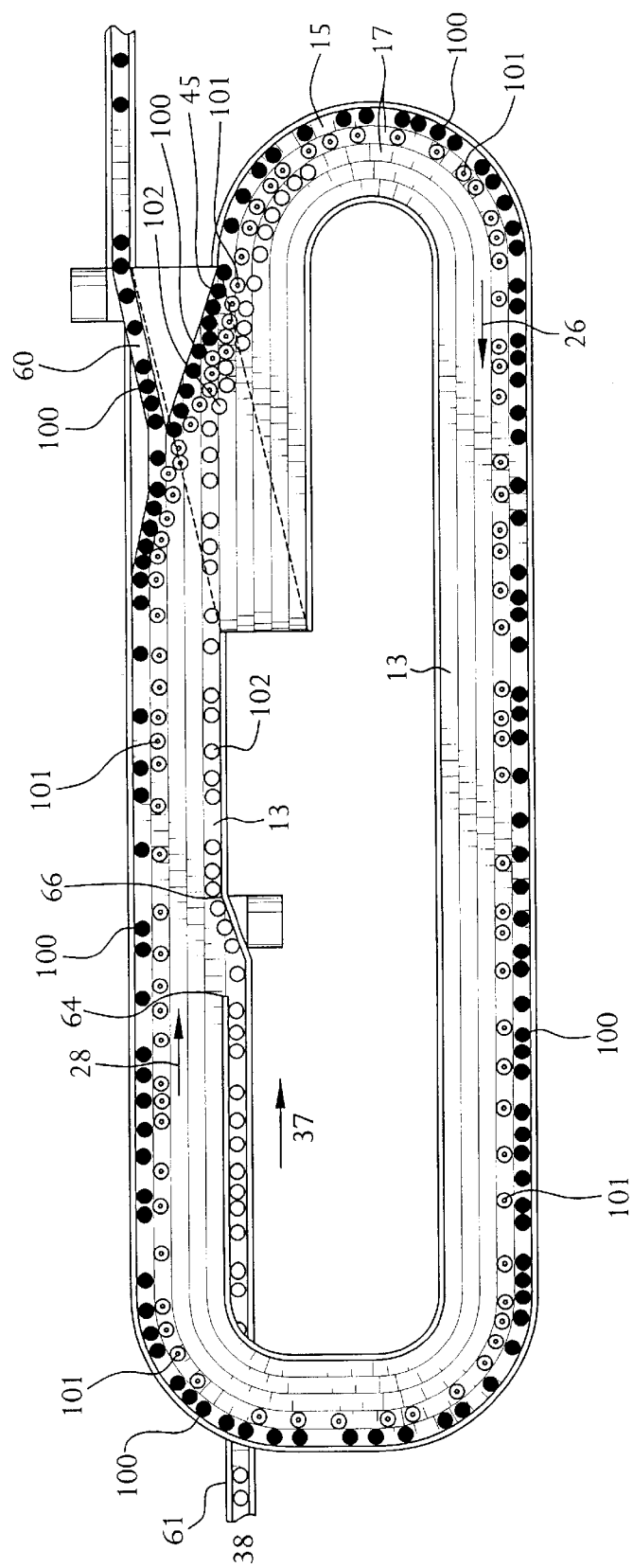
FIG. 3 is a top view of the product conveying and accumulation system of the present invention, showing an alternate embodiment for delivering product to the system.
Figure 4:
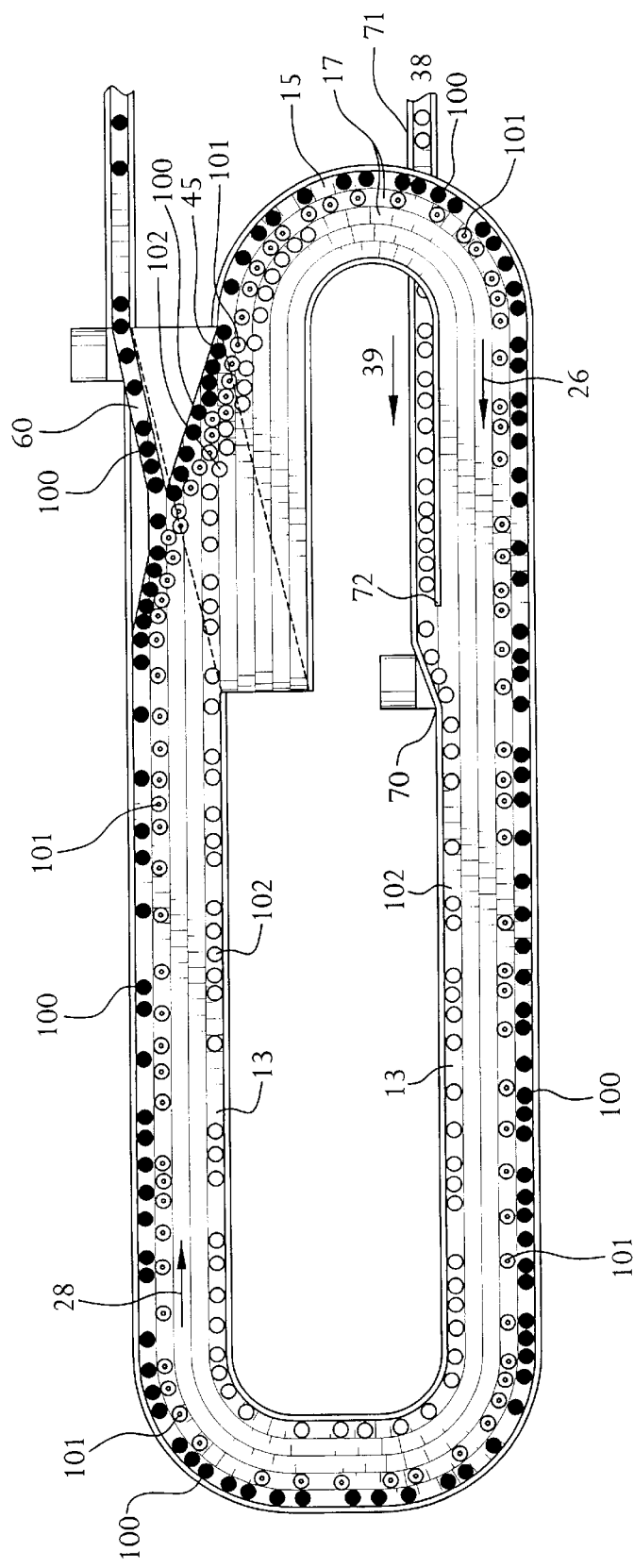
FIG. 4 is a top view of the product conveying and accumulation system of the present invention, showing another embodiment for delivering product to the system.

FIGS. 3 and 4 show alternate embodiments for delivering product to conveyor and accumulation system 10. Product is delivered from upstream destination 38 to inner pathway surface 13 via conveyors 61 and 71 respectively, located at different entry points on the inner pathway surface. Conveyors 61 and 71 also obliquely rise to substantially the same level as conveyor 12, where, between locations 64 and 66, and 70 and 72, respectively, product enters inner pathway surface 13 in the manner identical to that which has been described above, regarding product entry between locations 42 and 44 in FIG. 1.

Although three different embodiments, showing varying configurations of product supplying conveyors are disclosed, this invention is not so restricted. Other configurations for inputting product are contemplated, including the use of multiple conveyors operating in tandem to supply product to system 10, as specific needs arise. Also, product may be inputted from an upstream location or station by means of a conveyor or conveyors which are positioned above, rather than from underneath system 10. In such a case, for instance, the conveyor 34, shown in FIG. 1 could be located over conveyor 12 and obliquely descend from an upstream station 38 to location 40.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

I claim:

1. A product conveying and accumulation system, said system comprising:
    (a) first moving conveying means for the accumulation and transport of products, said conveying means being continuous and loop shaped in configuration and comprising inner and outer paths for transporting products around the conveyor means, said inner and outer paths being located in substantially the same transverse plane;
    (b) second moving conveying means for transporting products received from an upstream destination to the first conveying means and ultimately to a downstream destination, said second conveying means being substantially aligned adjacent to and, at the adjacent alignment, in substantially the same transverse plane as the inner path of the first conveying means for delivery and placement of products on the inner path, such that each product so delivered, at all times while being transported around the inner path of the first conveyor means, remains substantially stationary on and in relation to the inner path, whereby tandem movement of the first and second conveying means results in the upstream products initially transported from the second conveying means to the inner path, generally being the first products transported to the downstream destination; and
    (c) guide means for directing the upstream products initially transported from the second conveying means so that they generally are as the first products to be transported to the downstream destination; and
    (d) means for moving the first and second conveying means.

2. The product conveying and accumulation system as in claim 1 in which the first and second conveying means are positioned in substantially the same transverse plane at the adjacent alignment.

3. The product conveying and accumulation system as in claim 1 in which the first conveying means comprises a single, continuous conveyor.

4. The product conveying and accumulation system as in claim 1 in which the first and second conveying means move at substantially the same speeds.

5. The product conveying and accumulation system as in claim 1 in which the first and second conveying means move at substantially similar speeds.

6. The product conveying and accumulation system as in claim 1 wherein upstream products which are transported from the second conveying means after the initially transported products, are generally discharged to the downstream destination after the initially transported products are transported to the downstream destination.

7. The product conveying and accumulation system as in claim 1 in which the initial upstream products transported by the second conveying means to the inner path are generally moved from the inner path to the outer path before the products are transported to the downstream destination.

8. The product conveying and accumulation system as in claim 1 further comprising intermediate paths between the inner and outer paths.

9. The product conveying and accumulation system as in claim 7, further comprising intermediate paths between the inner and outer paths, said paths being configured such that product being transported from the upstream destination accumulates first on the outer path and then on the intermediate paths.

10. The product conveying and accumulation system as in claim 1 in which the first conveying means are aligned for contiguous movement in the same direction at the adjacent alignment.

11. The product conveying and accumulation system as in claim 1 in which the second conveying means is a single conveyor.

12. A product conveying and accumulation system, said system comprising:
    (a) a first loop shaped conveyor of predetermined length, said conveyor comprising inner and outer pathway surfaces for transporting products and which extend the length of the conveyor, said inner and outer pathway surfaces being located in substantially the same transverse plane;
    (b) at least one second conveyor means being substantially aligned adjacent to and, at the adjacent alignment, in substantially the same transverse plane as the inner pathway surface of the first conveyor for contiguous movement in the same direction as the first conveyor at the adjacent alignment and for delivery and placement of products onto the inner pathway surface, such that each product so delineated, at all times while being transported around the inner pathway surface, remains substantially stationary on and in relation to the inner pathway surface; and (c) product guide means for directing products from the first conveyor to a downstream destination, so that products initially transported from the second conveyor means to the inner pathway surface are generally the first products to be transported to the downstream destination: and (d) means for moving the first and second conveying means.

13. The product conveying and accumulation system as in claim 12 in which the first and second conveyor are positioned in substantially the same transverse plane at the adjacent alignment.

14. A product conveying and accumulation system as in claim 12 in which the first conveyor comprises a single continuous conveyor.

15. The product conveying and accumulation system as in claim 12 in which the first and second conveyor move at substantially the same speeds.

16. The product conveying and accumulation system as in claim 12 in which the first and second conveyors move at substantially similar speeds.

17. The product conveying and accumulation system as in claim 12 further comprising intermediate pathway surfaces between the inner and outer pathway surfaces.

18. The product conveying and accumulation system as in claim 12 wherein the system is configured such that product received from an upstream destination is transported from the to the inner pathway surface.

19. The product conveying and accumulation system as in claim 18 wherein the system is further configured such that product is transported from the inner pathway surface to the outer pathway surface.

20. The product conveying and accumulation system as in claim 19 wherein the system is further configured such that product is generally transported from the outer pathway surface to a downstream destination in the order it is received from the upstream destination.

21. The product conveying and accumulation system as in claim 17 wherein the system is configured such that product received from an upstream destination is transported from the second conveyor to the inner pathway surface and product is transported from the inner pathway surface to the outer pathway surface.

22. The product conveying and accumulation system as in claim 21 wherein the system is further configured such that product received from the upstream destination on the outer pathway surface is then accumulated on the intermediate pathway surfaces.

23. The product conveying and accumulation system as in claim 22 wherein the upstream is further configured such that product is generally transported from the outer pathway surface to a downstream destination in the order it is received from the upstream destination.

24. A method of transporting and accumulating products by means of a multiple conveyor system, said method comprising the steps of:

providing a continuous loop shaped first conveyor which comprises an inner path and an outer path, the inner and outer paths being located in substantially the same transverse plane;

aligning a second conveyor substantially adjacent to and contiguous with the inner path of the first conveyor;

aligning said first and second conveyors in substantially the same transverse plane at the adjacent alignment;

providing means for moving the first and second conveying means;

placing products on the second conveyor;

moving the second conveyor at a predetermined speed to transport the products to the inner path of the first conveyor;

delivering products to the inner path of the first conveyor, for transport of products on the inner path and the outer paths;

moving the first conveyor at a predetermined speed in tandem with the second conveyor;

transporting products around the loop of the first conveyor;

maintaining products delivered to the inner path, on the inner path, such that each product so delivered, at all times while being transported on the inner path, remains substantially stationary on and in relation to the inner path;

transporting products on the first conveyor, received from the second conveyor, to a downstream destination;

varying the transport of products to the downstream destination; transporting additional products on the second conveyor to the inner path of the first conveyor;

delivering additional products to the inner path of the first conveyor, for transport of the additional products on the inner path and the outer paths;

maintaining the additional products delivered to the inner path, on the inner path, such that each additional product so delivered, at all times while being transported on the inner path, remains substantially stationary on and in relation to the inner path; and transporting products from the first conveyor to the downstream destination generally in the order product is received from the second conveyor.

25. The method as in claim 24 comprising the further step of moving the first conveyor in the same direction as the second conveyor at the adjacent alignment.

26. The method of claim 24 comprising the further step of providing a guide to direct products from the first conveyor to the downstream destination.

27. The method as in claim 24 comprising the further step of transporting product from the inner path to the outer path.

28. The method as in claim 27 comprising the further step of generally transporting product from the outer path to the downstream destination before transporting later product received from the second conveyor.

29. The method of claim 24 comprising the further step of moving the first conveyor and the second conveyor at substantially similar predetermined speeds.

30. The method as in claim 24 comprising the further step of moving the first conveyor and the second conveyor at substantially the same speeds.

31. The method as in claim 24 wherein the product discharged from the first conveyor to the downstream destination is generally discharged from the outer path.

32. The method as in claim 24 comprising the further steps of transporting product from the inner path to the outer path and then accumulating product on intermediate paths between the inner and outer paths.

33. The method as in claim 32 comprising the further step of generally transporting product to the downstream destination first from the outer path, then from the intermediate paths and then from the inner paths.

* * * * *